(12) United States Patent
Qu et al.

(10) Patent No.: US 6,810,959 B1
(45) Date of Patent: Nov. 2, 2004

(54) LOW RESIDUE WELL TREATMENT FLUIDS AND METHODS OF USE

(75) Inventors: Qi Qu, Spring, TX (US); Xiaolan Wang, Baton Rouge, LA (US)

(73) Assignee: BJ Services Company, U.S.A., Houston, TX (US)

( * ) Notice: Subject to any disclaimer, the term of this patent is extended or adjusted under 35 U.S.C. 154(b) by 163 days.

(21) Appl. No.: 10/104,557

(22) Filed: Mar. 22, 2002

(51) Int. Cl.$^7$ .......................................... E21B 43/267
(52) U.S. Cl. ................. 166/300; 166/308.3; 166/308.5; 507/211; 507/215; 507/216; 507/217; 507/277; 507/903; 507/921; 507/922
(58) Field of Search .................... 166/280.1, 300, 166/308.3, 308.5, 280, 308; 507/211, 214, 215, 216, 217, 903, 921, 922, 277

(56) References Cited

U.S. PATENT DOCUMENTS

| | | | |
|---|---|---|---|
| 3,960,736 A | | 6/1976 | Free et al. |
| 4,021,355 A | * | 5/1977 | Holtmyer et al. |
| 4,464,270 A | * | 8/1984 | Hollenbeak et al. |
| 4,470,915 A | * | 9/1984 | Conway |
| 4,477,360 A | * | 10/1984 | Almond |
| 4,502,967 A | * | 3/1985 | Conway |
| 4,635,727 A | * | 1/1987 | Anderson et al. |
| 4,692,254 A | * | 9/1987 | Kucera |
| 4,780,223 A | * | 10/1988 | Baranet et al. |
| 4,801,389 A | * | 1/1989 | Brannon et al. |
| 4,988,806 A | | 1/1991 | Gruning et al. ............... 536/98 |
| 5,089,149 A | * | 2/1992 | Ridland et al. |
| 5,226,479 A | * | 7/1993 | Gupta et al. |
| 5,360,558 A | | 11/1994 | Pakulski et al. |
| 5,529,122 A | | 6/1996 | Thach .......................... 166/281 |
| 5,551,516 A | | 9/1996 | Norman et al. .............. 166/308 |
| 5,681,796 A | | 10/1997 | Nimerick ..................... 507/209 |
| 5,710,109 A | | 1/1998 | Surles ........................ 507/114 |
| 5,964,295 A | | 10/1999 | Brown et al. ................ 166/308 |
| 5,979,557 A | | 11/1999 | Card et al. ................... 166/300 |
| 6,035,936 A | | 3/2000 | Whalen ....................... 166/308 |
| 6,214,773 B1 | | 4/2001 | Harris et al. ................. 507/271 |
| 2002/0010101 A1 | * | 1/2002 | Pakulski et al. |

OTHER PUBLICATIONS

Morrison, Robert Thornton et al, Organic Chemistry, Prentice Hall, Inc., Sixth Edition, 1992, p. 1126.*
Product Overview web page, "CELQUAT® SC–230M (28–6830);" http://www.personalcarepolymers.com/Site/ProdView.asp?ID=0286830; printed Feb. 25, 2002; 1 page.
ELINCS/EINECS web page, "CELQUAT® SC–230M (28–6830), CELQUAT® SC–240C and SC–230M;" http://www.personalcarepolymers.com/Site/ProdRegView.asp?ID=0286830; printed Feb. 25, 2002; 1 page.
"CELQUAT® SC–230M (28–6830), POLYQUATERNIUM–10, A Conditioning Polymer for Cleansing Systems;" 4–page brochure from National Starch & Chemical.

* cited by examiner

Primary Examiner—George Suchfield
(74) Attorney, Agent, or Firm—Locke Liddell & Sapp LLP; John Wilson Jones

(57) ABSTRACT

A low residue well treatment fluid comprises: an aqueous solvent; a gelling agent comprising one or modified polysaccharides, the modified polysaccharides having hydrophilic groups; and a crosslinking composition. The fluid may optionally further comprise a gel breaker, a buffer and/or a proppant. The fluids generate no or minimal residue upon being broken, and are particularly useful in well fracturing operations.

23 Claims, No Drawings

LOW RESIDUE WELL TREATMENT FLUIDS AND METHODS OF USE

BACKGROUND OF THE INVENTION

1. Field of the Invention

This invention relates to fluids used to treat oil and gas wells, and more particularly, to low residue well treatment fluids, and to methods of making these fluids and using these fluids to treat oil wells.

2. Description of the Background

Gelled aqueous fluids have been developed and used extensively in the treatment and operation of subterranean formations. Such fluids have been applied in a variety of operations, including well completion, production stimulation, fluid loss control, and water production control.

For example, gelled fluids have been used to increase productivity and overcome well bore damage in subterranean formations through a process known as hydraulic fracturing. In the hydraulic fracturing process, a viscous fracturing fluid is pumped into the well bore at a pressure sufficient to create and extend fractures. A propping agent is usually suspended in the fracturing fluid to be deposited in the induced fractures and hold the fractures open after the pressure is released and the fracturing fluid flows back to the well. After the formation is fractured and the propping agent is in place, the fracturing fluid is usually broken by oxidizer breakers. These oxidizer breakers reduce the viscosity of the fracturing fluid so that the fluid is easily removed from the formation and, as a result, the production from the formation is not inhibited by the viscous fracturing fluid. The propping agent-filled fractures generated in the process serve as high conductive channels, thereby allowing produced fluids, such as hydrocarbon, to easily flow back to the well bore.

The most important component of the fracturing treatment process is the fracturing fluid. Different types of fracturing fluids have been developed. Polymer based aqueous fracturing fluids are the most widely used fracturing fluids used in well stimulation.

The main components of conventional polymer aqueous fracturing fluids are water, a water-soluble polymer, a crosslinking agent, a breaker, a buffer, and surfactants. Polymers commonly used in fracturing fluids include guar gum and chemically modified guar gum derivatives such as hydroxypropyl guar (HPG), carboxymethylhydroxypropyl guar (CMHPG) and carboxymethyl guar (CMG). Guar gum is the most widely used polymer in fracturing fluids because of its low cost. However, when the guar gum in guar gum polymer based fracturing fluid is broken by oxidizers, insoluble residue is generated. This residue can cause blockage of the generated conductive channels and a decrease in the production rate of the formation.

Although guar gum derivatives have previously been considered to be "cleaner polymers" than natural guar gum (i.e., generating less residue when broken by breakers), nonetheless, some test results indicate that the residue generated and the resulting damage is about the same for guar gum and guar gum derivatives.

A number of alternative fracturing fluids have been developed in an effort to allow fracturing of a well with less formation damage. For example, U.S. Pat. No. 5,681,796 to Nimerick describes a fracturing fluid system with a reduced polymer concentration and a buffering system. Although the polymer loading may be reduced, the insoluble residue generated from the broken polymer still causes blockage of the generated conductive channels and a decrease in the formation production rate.

Another type of non-polymer fracturing fluid, i.e., a viscoelastic surfactant system, is described in U.S. Pat. No. 5,551,516 to Norman et al. The fluid of this system is comprised of a water-soluble salt, various quaternary ammonium halide salt surfactants as thickening agents, and an organic stabilizing agent such as sodium salicylate. This solid free surfactant system is described as having thermal stability, adequate viscosity and proppant transport capability. The viscosity of this fluid is a result of the rod-like micelle structure rather than the presence of a polymer. The absence of polymer residue presents fewer problems for fracture clean-up as compared to polymer based fracturing fluids.

One disadvantage associated with such viscoelastic systems relates to their ineffectiveness when applied to high permeability formations. Because there is no polymer in the viscoelastic surfactant fracturing fluids, no filter cake is formed once this fluid is pumped into the formation. As a result, the fluid loss to the formation may be high. In addition, because the fluid may penetrate into the formation, there is an increased risk of formation damage and decreased fracture length. In addition, the cost of surfactant based fracturing fluids is high.

Thus, there is a need for a well treatment fluid that combines the benefits of both polymer systems and viscoelastic surfactant systems, i.e., a well treatment fluid which generates minimal residue, while at the same time minimizing fluid leak off, for example, during fracturing operations.

SUMMARY OF THE INVENTION

The present invention overcomes problems and disadvantages associated with current fluid compositions, and provides well treatment fluids using natural and derivatized polysaccharides modified with hydrophilic groups to increase polymer solubility. The modified polysaccharides in the preferred fluids of the invention generate minimal or no residue upon being broken, thereby causing less damage to the formation and proppant bed. At the same time, preferred fluids form a filter cake upon contact with the formation to prevent fluid leak off. Well treatment fluids of the invention are particularly useful in fracturing operations.

In preferred embodiments of the invention, the well treatment fluid is broken in a controlled manner by a gel breaker, which is preferably a delayed gel breaker, in the fluid. Because the broken polymer fragments of the modified polysaccharide are easy to dissolve, little or no polymer residue is generated and left in the treated subterranean zones when the fluid is broken. The present invention avoids the problems seen with the polymer thickeners used in conventional fluids, which form insoluble residues that may damage the formation, at either regular or reduced gelling agent concentrations.

Accordingly, one embodiment of the invention is directed to a well treatment fluid comprising: an aqueous solvent; a gelling agent comprising one or more modified polysaccharides, the modified polysaccharides having hydrophilic groups; and a crosslinking composition. Preferably, the fluid further comprises a gel breaker, a buffer and proppant.

The invention also includes methods to treat and/or fracture a subterranean formation. One such method comprises the step of injecting a well treatment fluid according to the invention into the formation. Preferably, the fluid is injected at a sufficient pressure to generate a plurality of fractures in the formation. Preferably, the fluid carries a proppant into the plurality of fractures and deposits the proppant in the fractures. Preferably, the fluid further includes a gel breaker, and the method further comprises allowing the gel breaker to break the well treatment fluid down to a thin fluid, and allowing the thin fluid to flow back through the well bore to the surface.

Still another embodiment is directed to a method of preparing a well treatment fluid comprising the steps of: providing a plurality of components comprising an aqueous solvent, a gelling agent, and a crosslinking composition; and combining the plurality of components to form a well treatment fluid having a viscosity of above about 50 centipoise at 100 $\sec^{-1}$. The gelling agent comprises one or more modified polysaccharides having hydrophilic groups. The method may optionally comprise adding a buffer, a gel breaker and/or proppant to the fluid.

Other objects and advantages of the invention are set forth in part in the description which follows, and, in part, will be obvious from this description, or may be learned from the practice of the invention.

DESCRIPTION OF THE INVENTION

The present invention is directed to well treatment fluids that leave minimal or no residue in the treated formation, while at the same time minimizing the problem of leak off seen with viscoelastic fluids.

It has been discovered that by incorporating modified polysaccharides that have hydrophilic (e.g., cationic, anionic, nonionic or amphoteric) groups, a low or no residue well treatment fluid is obtained. The hydrophilic groups are preferably randomly distributed on the polymer side chains of the modified polysaccharides. Preferably, the modified polysaccharides are further crosslinked with a suitable crosslinking agent to form a viscous crosslinked gel.

The hydrophilic groups make the broken polysaccharide fragments easier to dissolve while maintaining the high viscosity of natural polymer. In preferred fluids according to the invention having a breaker system, the broken polysaccharide is more water soluble than the broken polymer in conventional fluids with unmodified polymer. Even in fluids without a breaker, the whole/unbroken modified polysaccharide of the invention is more water soluble than the whole/unbroken polymer used in these conventional fluids. The increased solubility of the modified polymers of the invention reduces or eliminates the insoluble residues seen with known well treatment fluids which use insoluble polymers. Because minimal or no insoluble polymer residue is formed when the preferred well treatment fluids of the invention are broken, there is less damage to the fracture sand pack and the surrounding subterranean formation after fracturing treatment.

A preferred fluid according to the invention comprises: an aqueous solvent; a gelling agent comprising one or more modified polysaccharides, the modified polysaccharides having hydrophilic groups; and a crosslinking composition. The fluid may optionally further comprise a gel breaker, a buffer and/or a proppant. In a preferred embodiment, the hydrophilic groups are randomly distributed cationic hydrophilic groups.

The aqueous solvent may be fresh water, salt water, seawater, natural or synthetic brine, or any other aqueous liquid that does not adversely react with the other components of the well treatment fluid to affect its performance.

The gelling or viscosifying agent preferably comprises one or more modified polysaccharides. The polysaccharides may be natural or derivatized. Natural and derivatized polysaccharides that may be used in the practice of the invention include, but are not limited to, naturally occurring gums such as guar, locust bean, tara, karaya, arabic, ghatti, tragacanth and the like, and their derivatives such as hydroxypropylguar (HPG), carboxymethylguar (CMG), and carboxymethylhydroxypropylguar (CMHPG). Other groups of polysaccharides, such as derivatized celluloses, may also be employed in the practice of the invention. Such derivatized celluloses include, but are not limited to: various carboxyalkyl cellulose ethers, such as carboxyethyl cellulose and carboxymethyl cellulose (CMC); mixed ethers such as carboxymethyl hydroxyethyl cellulose (CMHEC); hydroxyalkyl celluloses such as hydroxyethyl cellulose (HEC) and hydroxypropyl cellulose (HPC); hydroxyalkylalkyl celluloses such as hydroxypropylmethyl cellulose; alkylalkyl celluloses such as methylethyl cellulose; alkylcarboxyalkyl celluloses such as ethylcarboxymethyl cellulose; alkyl celluloses such as ethyl cellulose and methyl cellulose; and alkylhydroxyalkyl celluloses such as methylhydroxypropyl cellulose, and the like. If desired, mixtures or combinations of any of the polysaccharides described herein may be used.

As noted, the Polysaccharides used in preferred embodiments of the invention are modified to have hydrophilic groups. Modification of the Polysaccharides is preferably achieved by grafting hydrophilic pendant chains onto the polymer. For example, hydrophilic pendant chains could be introduced through chemical reactions, such as esterification, substitution, etc., in between the carboxyl or hydroxyl groups of the polymers and the functional groups of the hydrophilic pendant molecules. Useful hydrophilic pendant chains include, but are not limited to, quaternary ammonium salts, alkanolamides, ethoxylates, alkyl betaines, sultaines, sulfates and sulfonates. Preferably, the hydrophilic chains are randomly distributed cationic pendant chains.

The chemical modification with hydrophilic groups imparts beneficial properties to the polymers, which may include improved thickening effect, broader pH range for hydration and improved solubility. As previously noted, the hydrophilic groups make the whole and broken polymer fragments easier to dissolve than unmodified polymer, while nonetheless maintaining the high viscosity of natural polymer.

One example of cationic hydrophilic modification of a polysaccharide useful in the practice of the invention is described in U.S. Pat. No. 4,988,806 to Gruning et al. In Gruning, a portion of the carboxymethyl groups on the carboxymethylcellulose has been replaced by groups of quaternary ammonium salts.

Another example of polymers useful in the practice of the invention is modified polymers commercially available under the trademark CELQUAT® from National Starch & Chemical, Bridgewater, N.J. A particularly preferred modified polymer of the CELQUAT® family is CELQUAT® SC-230M. CELQUAT® SC-230M is a quaternary cellulose derivative. Specifically, it is a polymeric quaternary ammonium salt of hydroxyethyl cellulose reacted with a trimethyl ammonium substituted epoxide.

The fluid of the invention also preferably includes a crosslinking composition comprising one or more crosslinking agents. The use of a crosslinking agent substantially increases the viscosity of the polymer solution by forming a crosslinked polymer network in the aqueous based fluid. While a variety of crosslinking agents can be utilized to crosslink the polysaccharide gelled aqueous liquid, preferred crosslinking agents include, but are not limited to, boron, zirconium and titanium-based crosslinkers. Examples of such crosslinking agents include: borate ion releasing compounds, such as boric acid, boric oxide, pyroboric acid, metaboric acid, borax, sodium tetraborate, pentaborate; and transition metal ion releasing compounds, such as titanium dioxide, zirconium oxychloride, zirconium lactate, zirconium glycolate, zirconium lactate triethanolamine, zirconium acetylacetonate, titanium citrate, titanium malate, titanium tartrate, and other titanium and zirconium chelates. If desired, mixtures or combinations of the crosslinking agents may be used in the crosslinking composition.

Particularly preferred crosslinking compositions also comprise a delaying agent. These delaying agents delay the rate of crosslinking reaction for a sufficient time to allow the aqueous gel to be pumped into the subterranean zone.

The fluid also optionally includes one or more gel breakers. Useful gel breakers include, but are not limited to, ammonium persulfate, sodium persulfate, sodium bromate and sodium chlorite. Preferably, the gel breaker is a delayed gel breaker, such as encapsulated ammonium persulfate. A delayed gel breaker slowly releases the oxidizer from the polymer coating to enable a strong initial gel to carry and to deposit the proppant in the formation.

The fluid also optionally includes one or more proppants suspended in the fluid. Useful proppants include, but are not limited to, gravel, sand, resin coated sand, ceramic beads, bauxite, glass, glass beads and mixtures or combinations thereof.

The fluid also optionally includes one or more buffers. Useful buffers include, but are not limited to, potassium carbonate, sodium carbonate, potassium bicarbonate, sodium bicarbonate, potassium hydroxide, sodium hydroxide, and mixtures and combinations thereof. Preferably, the buffer is added in an amount to maintain or provide a final pH of the fluid of between about 3 and 12.

The fluid of the invention also may optionally include one or more conventional additives that do not adversely affect the performance of the well treatment fluid. Such additives include, but are not limited to, clay stabilizers, gel stabilizers, surfactants, bactericides and the like.

Preferred fluids of the invention have a viscosity of above about 50 centipoise at 100 $\sec^{-1}$, and, more preferably, above about 100 centipoise at 100 $\sec^{-1}$. After the gel is broken, preferably, the viscosity is below about 10 centipoise at 100 $\sec^{-1}$.

As will be clear to those of skill in the art, the precise amounts of the various components used to make the fluid may vary, depending on the particular ingredients used and the desired viscosity and other characteristics of the well treatment fluid. In a preferred embodiment, however, the gelling agent is preferably present in the well treatment fluid in an amount of about 0.12 weight % to about 0.48 weight %, and, more preferably, in an amount of from about 0.18 weight % to about 0.42 weight % based on the total weight of the aqueous solvent. The crosslinking composition is preferably present in the well treatment fluid in the amount of from about 0.05 weight % to about 0.6 weight %, and, more preferably, in an amount of from about 0.1 weight % to about 0.5 weight % based on the total weight of the aqueous solvent. The gel breaker, if present, is preferably present in the well treatment fluid in an amount of from about 0.01 weight % to about 0.2 weight %, and, more preferably, in an amount of from about 0.02 weight % to 0.1 weight % based on the total weight of the aqueous solvent.

A particularly preferred well treatment fluid according to the present invention comprises: water; a hydrophilically modified polysaccharide gelling agent, preferably present in an amount of about 0.18 weight % to about 0.42 weight % based on the total weight of the aqueous solvent; a crosslinking composition, preferably present in an amount of about 0.1 weight % to about 0.5 weight % based on the total weight of the aqueous solvent; and a delayed gel breaker for reducing the viscosity of the well treatment fluid to a thin fluid, preferably present in an amount of about 0.02 weight % to about 0.1 weight % based on the total weight of the aqueous solvent in the well treatment fluid.

In this embodiment, the crosslinking composition may comprise a solvent, an organozirconate or organotitanate borate crosslinker and, optionally, a delaying agent, such as a polyhydroxyl containing compound. Alternately, the crosslinking composition may comprise a zirconium or titanium crosslinking agent, or a mixture of them. The delayed gel breaker may comprise encapsulated ammonium persulfate. The fluid may optionally comprise a buffer, such as sodium hydroxide, to adjust the pH to about 12.

In another particularly preferred embodiment, the fluid comprises CELQUAT® SC-230M as a gelling agent, zirconium lactate as the crosslinking agent in the crosslinking composition, and encapsulated ammonium persulfate as a delayed gel breaker.

The invention also includes methods for preparing the well treatment fluids of the invention. One such method of preparing a well treatment fluid comprises the steps of: providing a plurality of components comprising an aqueous solvent, a gelling agent, and a crosslinking composition; and combining the plurality of components to form a well treatment fluid. Preferably, the resulting fluid has a viscosity of above about 50 centipoise at 100 $\sec^{-1}$. The gelling agent preferably comprises one or more of any of the modified polysaccharides having hydrophilic groups described herein. The crosslinking composition preferably comprises one or more of any of the crosslinking agents described herein. The method may optionally comprise adding other ingredients/components to the fluid, such as a buffer, gel breaker and/or proppant.

Although the components of the well treatment fluid may be mixed or combined in any order, in a preferred embodiment, the gelling agent is first dissolved in the aqueous solvent to form a viscous fluid. Specifically, when the gelling agent is mixed and stirred in water, the gelling agent becomes hydrated to form a gelled, viscous fluid. The crosslinking composition is then added to the viscous fluid. Optionally, a buffer may be added to the viscous fluid prior to adding the crosslinking composition.

If desired, the crosslinking composition, any buffering agent, any gel breaker and any proppant can be metered and pumped into the gelled aqueous fluid as the gelled aqueous fluid is actually being pumped into the well bore. Thus, the well treatment fluids of the invention allow the user the option of mixing the components on site as the fluid is being used.

The invention also includes methods for treating or fracturing a subterranean zone using the fluids of the invention. One such method for treating or fracturing a subterranean zone penetrated by a well bore comprises of the following steps. A viscous non-residue well treatment fluid according to the present invention is prepared or otherwise obtained. For example, a preferred fluid might comprise: water; a modified polysaccharide gelling agent; a buffering agent; a delayed crosslinking composition; a delayed gel breaker; and a proppant. However, as is clear to those of skill in the art, any of the various well treatment fluids described herein can be used without departing from the scope of the invention.

The well treatment fluid of the invention is pumped or injected into the subterranean formation (e.g., from the surface through the well bore). Preferably, the fluid is pumped or injected at a pressure sufficient to fracture the formation (e.g., generate a plurality of fractures), and thus to enable the particulate solid propping agent/proppant suspended in the well treatment fluid to be carried into the fractures by the fluid and deposited in them.

Preferably, the well treatment fluid contains a gel breaker and the method further comprises allowing the gel breaker to break down the viscous well treatment fluid into a thin fluid, and allowing the thin fluid to flow back to the surface, leaving the proppant in the generated fractures.

Preferably, the well treatment fluid has a viscosity above about 50 centipoise at 100 sec$^{-1}$ and, more preferably, above about 100 centipoise at 100 sec$^{-1}$ when it is injected. After being broken, the fluid preferably has a viscosity below about 10 centipoise at 100 sec$^{-1}$.

Although the fluids of the invention are particularly useful in hydraulic fracturing operations, they are not limited thereto. The fluids of the invention may be used in a wide variety of well treatment applications.

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLES

Example 1
Viscosity Testing/Variation of Temperature 2.4 g of CELQUAT® SC-230M (as a modified cationic gelling agent) was added to 1 liter of water (as an aqueous solvent), followed by about 0.05 weight % based on the total weight of the aqueous solvent of quaternary amine polyelectrolyte (as a clay stabilizer).

After hydrating the mixture by a Waring blender for 10 minutes, the pH was adjusted to about 12 with sodium hydroxide. Zirconium lactate crosslinker was added in an amount of 0.4 weight % based on the total weight of the aqueous solvent (water) and the solution was mixed until it was fully crosslinked.

In the resulting fluid, the cationic polysaccharide gelling agent comprised 0.24 weight % based on the total weight of the aqueous solvent (water).

Thereafter, a 40 milliliter sample of crosslinked gel was placed into a Fann 50C viscometer cup. The Fann 50C bob and cup arrangement used an R1B5 configuration.

The sample was placed on the Fann 50C viscometer and sheared at 100 s$^{-1}$ constantly while the temperature was raised to the test temperature. After reaching the test temperature, a rate ramp followed using 100, 88, 59 and 29 s$^{-1}$ while measuring the stress at each shear rate. After the ramp, the shear rate returned to 100 s$^{-1}$. The rate ramps were repeated every 7 minutes and the interim rate between ramps remained at 100 s$^{-1}$.

For fracturing operations, it is often desirable to have a fracturing fluid with a viscosity value above 100 centipoise at 100 s$^{-1}$. Therefore, the gel stable time in this Example was defined as the time that the fluid viscosity exceeded the 100 cps standard. In this test, the prepared crosslinked fluid was tested at 140° F., 160° F., and 180° F., respectively. The results of the testing are given in Table I.

TABLE I

Viscosity of die Treating Fluid at Different Temperatures (Viscosity at 100 sec$^{-1}$, centipoise)

| Elapsed Time (minutes) | Viscosity at Test Temperature (140° F.) | Viscosity at Test Temperature (160° F.) | Viscosity at Test Temperature (180° F.) |
|---|---|---|---|
| 0 | 534 | 512 | 344 |
| 30 | 454 | 411 | 280 |
| 60 | 400 | 347 | 213 |
| 120 | 342 | 287 | 121 |
| 180 | 309 | 239 | 75 |
| 240 | 282 | 199 | 50 |

The resulting data demonstrate the suitability of the fluid for fracturing. The polymer concentration of 0.24 weight % based on the total weight of the aqueous solvent (water) provided a gel stable time of more than 4 hours at 140° F. and 160° F., and more than 2 hours at 180° F.

Example 2
Viscosity Testing/Variation of Crosslinking Agent Concentration

In this experiment, base fluid comprising CELQUAT® SC-230M in an amount of 0.36 weight % based on the total weight of the aqueous solvent (water) was used.

Specifically, 3.6 g of CELQUAT® SC-230M was added to 1 liter of water followed by about 0.05 weight % based on the total weight of the aqueous solvent of quaternary amine polyelectrolyte as a clay stabilizer. After hydrating for 10 minutes, the pH was adjusted to about 12 with sodium hydroxide. A zirconium lactate crosslinker was added to three different samples in amounts of 0.3, 0.4 and 0.5 weight % based on the total weight of the aqueous solvent (water), respectively, and each sample was mixed until it was fully crosslinked. Thereafter, the procedures set forth in Example 1 were repeated. The results of these tests are shown in Table II.

TABLE II

Viscosity of the Treating Fluid at Different Crosslinker Concentration (Viscosity at 100 sec$^{-1}$, centipoise)

| Elapsed Time (minutes) | Viscosity using 0.3% Zr Crosslinker | Viscosity using 0.4% Zr Crosslinker | Viscosity using 0.5% Zr Crosslinker |
|---|---|---|---|
| 0 | 325 | 376 | 513 |
| 30 | 288 | 327 | 456 |
| 60 | 211 | 260 | 395 |
| 90 | 150 | 223 | 346 |
| 120 | 113 | 193 | 313 |
| 150 | 86 | 172 | 286 |
| 180 | 69 | 153 | 265 |

The data presented in Table II indicate that the stability time of the fluid is related to the crosslinker concentration. Increasing crosslinker loading from 0.3% to 0.5% increased the gel stability time significantly.

Example 3
Standard Retained Conductivity

As is well known to those of skill in the art, it is important to remove the broken gel from the generated conductivity channels upon completion of well treatment to maximize the production rate. The retained conductivity of the proppant bed is a useful indication of the cleanness of a well treatment fluid.

In this example, a standard retained conductivity experiment was performed at 180° F. on a well treatment fluid with CELQUAT® SC-230M in an amount of 0.36 weight % based on the total weight of the aqueous solvent (water). 2% KCl solution was used as a baseline solution.

Specifically, 3.6 g of CELQUAT® SC-230M was added to one liter of water followed by about 0.5 ml of quaternary amine polyelectrolyte as a clay stabilizer.

After hydrating for 10 minutes, the pH was adjusted to about 12 by adding sodium hydroxide. Subsequently, 0.72 g of encapsulated ammonium persulfate were added as a delayed gel breaker to achieve a concentration of 0.072 weight % of encapsulated breaker based on the total weight of the aqueous solvent (water). In addition, a zirconium lactate crosslinker was added in an amount of 0.3 weight % based on the total weight of the aqueous solvent (water). The components were then mixed until the fluid was fully crosslinked.

A slurry of 30 ml of this crosslinked well treatment fluid and 64 grams of 20/40 Carbolite® (Carbo Ceramics, Inc., Irving, Tex.) lightweight proppant was placed into a specially designed cell and the cell was shut in for 17 hours. Temperature of 180° F. and closure pressure of 1000 psi were applied. After the shut-in period, regain was initiated at 0.5 ml/minute with 2% KCl to obtain the initiation pressure drop through the proppant pack at 100 psi. Rate was then increased to 2 ml/minute and the closure stress ramped to 4000 psi at 1000 psi/minute. The 2% KCl regain rate remained at 2 ml/minute for 20 hours and then increased to 20 ml/minute for 5 additional hours at 275° F. and 4000 psi closure stress. Following the 25 hour 2% KCl regain period, a wet gas regain was performed. Following the wet gas regain, a final 2% KCl regain was performed for 10 hours. The test results showed a retained permeability of 97%.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the methods described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention. Not all embodiments of the invention will include all the specified advantages. The specification and examples should be considered exemplary only with the true scope and spirit of the invention indicated by the following claims.

We claim:

1. A method to treat or fracture a subterranean formation comprising the steps of:
    injecting a well treatment fluid into the formation at a sufficient pressure to generate a plurality of fractures in the formation, wherein the well treatment fluid comprises:
    an aqueous solvent;
    a gelling agent comprising one or more modified polysaccharides, said modified polysaccharides having hydrophilic groups selected from the group consisting of quaternary ammonium salt cellulose derivatives, alkanolamides, alkyl betaines and sultaines; and
    a crosslinking composition.

2. A method to treat or fracture a subterranean formation comprising the steps of:
    injecting a well treatment fluid into the formation at a sufficient pressure to generate a plurality of fractures in the formation, wherein the well treatment fluid comprises:
    an aqueous solvent;
    a gelling agent, said gelling agent comprising one or more modified polysaccharides comprising one or more polysaccharides selected from the group consisting of a carboxyalkyl cellulose ether, a carboxymethyl hydroxyethyl cellulose (CMHEC), a hydroxyalkyl cellulose, a hydroxyalkylalkyl cellulose, an alkylalkyl cellulose, an alkylcarboxyalkyl cellulose, an alkyl cellulose and an alkylhydroxyalkyl cellulose, wherein the polysaccharides are modified with cationic or amphoteric hydrophilic groups; and
    a crosslinking composition.

3. The method of claim 1 wherein the one or more modified polysaccharides are modified from one or more polysaccharides selected from the group consisting of guar gum, locust bean gum, tara gum, karaya gum, arabic gum, ghatti gum, tragacanth gum, hydroxypropylguar (HPG), carboxymethylguar (CMG), carboxymethylhydroxypropylguar (CMHPG), a carboxyalkyl cellulose ether, a carboxymethyl hydroxyethyl cellulose (CMHEC), a hydroxyalkyl cellulose, a hydroxyalkylalkyl cellulose, an alkylalkyl cellulose, an alkylcarboxyalkyl cellulose, an alkyl cellulose and an alkylhydroxyalkyl cellulose.

4. The method of claim 1 wherein the gelling agent is present at about 0.12 weight % to about 0.48 weight % based on the total weight of the aqueous solvent.

5. The method of claim 1 wherein the crosslinking composition comprises one or more crosslinking agents, and wherein said one or more crosslinking agents are selected from the group consisting of boric acid, boric oxide, pyroboric acid, metaboric acid, borax, sodium tetraborate, pentaborate, titanium dioxide, zirconium oxychloride, zirconium lactate, zirconium glycolate, zirconium lactate triethanolamine, zirconium acetylacetonate, titanium citrate, titanium malate, titanium tartrate, a titanium chelate and a zirconium chelate.

6. The method of claim 1 wherein the crosslinking composition is present at about 0.05 weight % to about 0.6 weight % based on the total weight of the aqueous solvent.

7. The method of claim 1 wherein said well treatment fluid further comprises a gel breaker.

8. The method of claim 7 wherein the gel breaker is selected from the group consisting of ammonium persulfate, sodium persulfate, sodium bromate and sodium chlorite.

9. The method of claim 7 wherein the gel breaker is present at about 0.01 weight % to about 0.2 weight % based on the total weight of the aqueous solvent.

10. The method of claim 1 wherein the one or more modified polysaccharides comprise a polymeric quaternary ammonium salt of hydroxyethyl cellulose reacted with a trimethyl ammonium substituted epoxide.

11. The method of claim 1 wherein said well treatment fluid further comprises a proppant suspended in said fluid, and said well treatment fluid carries said proppant into said plurality of fractures and deposits said proppant in said fractures.

12. The method of claim 7 wherein the well treatment fluid is injected into the formation at the surface through a well bore, and wherein the well treatment has a first viscosity prior to injection, and the method further comprises the steps of:

allowing the gel breaker to break the well treatment fluid down to a thin fluid having a second viscosity lower than said first viscosity; and allowing the thin fluid to flow back to the surface.

13. The method of claim 12 wherein the first viscosity is above about 50 centipoise at 100 sec$^{-1}$ and the second viscosity is below about 10 centipoise at 100 sec$^{-1}$.

14. The method of claim 1 wherein said well treatment fluid further comprises a buffer.

15. The method of claim 2 wherein the cationic hydrophilic groups are quaternary ammonium salts.

16. The method of claim 2 wherein the crosslinking composition comprises one or more crosslinking agents, and wherein said one or more crosslinking agents are selected from the group consisting of boric acid, boric oxide, pyroboric acid, metaboric acid, borax, sodium tetraborate, pentaborate, titanium dioxide, zirconium oxychloride, zirconium lactate, zirconium glycolate, zirconium lactate triethanolamine, zirconium acetylacetonate, titanium citrate, titanium malate, titanium tartrate, a titanium chelate and a zirconium chelate.

17. The method of claim 16 wherein the crosslinking composition comprises zirconium lactate.

18. The method of claim 2 wherein said well treatment fluid further comprises a gel breaker.

19. The method of claim 18 wherein the gel breaker is selected from the group consisting of ammonium persulfate, sodium persulfate, sodium bromate and sodium chlorite.

20. The method of claim 2 wherein the one or more modified polysaccharides are polymeric quaternary ammonium salts of hydroxyethyl cellulose reacted with a trimethyl ammonium substituted epoxide.

21. The method of claim 20 wherein the crosslinking composition comprises zirconium lactate and the gel breaker comprises encapsulated ammonium persulfate.

22. The method of claim 2 wherein said well treatment fluid further comprises a proppant suspended in said fluid, and said well treatment fluid carries said proppant into said plurality of fractures and deposits said proppant in said fractures.

23. The method of claim 10 further wherein the crosslinking composition comprises zirconium lactate and the gel breaker comprises encapsulated ammonium persulfate.

* * * * *